(12) United States Patent
Ushita et al.

(10) Patent No.: US 6,632,761 B1
(45) Date of Patent: Oct. 14, 2003

(54) SILICON CARBIDE POWDER, METHOD OF PRODUCING A GREEN BODY, AND METHOD OF PRODUCING A SINTERED SILICON CARBIDE

(75) Inventors: Kazuhiro Ushita, Kodaira (JP); Fumio Odaka, Niiza (JP); Yoshitomo Takahashi, Fujisawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/637,608

(22) Filed: Aug. 15, 2000

(30) Foreign Application Priority Data

Aug. 24, 1999 (JP) ............................. 11-237000
Jul. 17, 2000 (JP) ........................ 2000-216309

(51) Int. Cl.[7] ....................... C04B 35/52; C04B 35/56; C04B 35/03
(52) U.S. Cl. ......................... 501/88; 501/92; 501/90; 252/516; 264/86; 264/299
(58) Field of Search ................ 501/88, 92, 87, 501/90; 252/516; 264/86, 299; 423/345

(56) References Cited

U.S. PATENT DOCUMENTS

| | | | | |
|---|---|---|---|---|
| 4,771,021 A | * | 9/1988 | Tamamizu et al. | 501/88 |
| 4,863,657 A | * | 9/1989 | Tanaka et al. | 264/653 |
| 4,914,063 A | * | 4/1990 | Pugar et al. | 501/89 |
| 5,179,049 A | * | 1/1993 | Numata et al. | 264/651 |
| 5,318,761 A | * | 6/1994 | Kojima et al. | 423/345 |
| 5,464,655 A | * | 11/1995 | Takahata | 427/238 |
| 5,589,116 A | * | 12/1996 | Kojima et al. | 264/628 |
| 5,618,510 A | * | 4/1997 | Okada et al. | 423/346 |
| 5,643,843 A | * | 7/1997 | Dunmead et al. | 501/92 |
| 5,762,895 A | * | 6/1998 | Schwetz et al. | 423/345 |
| 5,840,221 A | * | 11/1998 | Lau et al. | 264/29.1 |
| 5,902,760 A | * | 5/1999 | Dynan et al. | 501/88 |
| 5,904,892 A | * | 5/1999 | Holmes | 264/166 |
| 5,928,601 A | * | 7/1999 | Miyake et al. | 264/659 |
| 5,972,818 A | * | 10/1999 | Dynan et al. | 501/88 |
| 6,027,664 A | * | 2/2000 | Weiss et al. | 252/62.52 |
| 6,090,733 A | * | 7/2000 | Otsuki et al. | 252/516 |
| 6,136,115 A | * | 10/2000 | Highsmith et al. | 149/109.6 |
| 6,136,241 A | * | 10/2000 | Gauckler et al. | 264/102 |
| 6,162,543 A | * | 12/2000 | Dubots et al. | 428/306.6 |
| 6,168,833 B1 | * | 1/2001 | Leushake et al. | 427/248.1 |
| 6,214,755 B1 | * | 4/2001 | Otsuki et al. | 264/682 |
| 6,228,293 B1 | * | 5/2001 | Kriegsmann et al. | 264/29.7 |
| 6,245,424 B1 | * | 6/2001 | Lau et al. | 428/368 |

FOREIGN PATENT DOCUMENTS

| | | |
|---|---|---|
| JP | 61006110 A | 1/1986 |
| JP | 05024818 A | 2/1993 |
| JP | 10067565 A | 3/1998 |

OTHER PUBLICATIONS

Reed. James S., "Principles of Ceramics Processing," 1995, John Wlley and Sons, Inc., pp. 219–225.*

* cited by examiner

Primary Examiner—Tom Dunn
Assistant Examiner—Colleen P. Cooke
(74) Attorney, Agent, or Firm—Oliff & Berridge, PLC

(57) ABSTRACT

A silicon carbide powder which can increase the densities of a green body and a sintered silicon carbide, a method of producing a green body having a high density and excellent handling properties, and a method of producing a sintered silicon carbide having a high density, in which methods the silicon carbide powder is used. The silicon carbide powder includes at a particulate volume ratio of 20% to 80% a silicon carbide powder whose model ratio is 1.7 μm to 2.7 μm and a silicon carbide powder whose model ratio is 10.5 μm to 21.5 μm. The silicon carbide powder is used in the method of producing a green body and in the method of producing a sintered silicon carbide powder.

15 Claims, No Drawings

SILICON CARBIDE POWDER, METHOD OF PRODUCING A GREEN BODY, AND METHOD OF PRODUCING A SINTERED SILICON CARBIDE

BACKGROUND OF THE INVENTION

1. Field of the Invention

The present invention relates to a silicon carbide powder which is a raw material of sintered silicon carbide, a method of producing a green body, and a method of producing a sintered silicon carbide. By green body is meant a compact of silicon carbide in which many pores are present.

2. Description of the Related Art

Conventionally, silicon carbide has attracted attention as a material used in high-temperature areas from the standpoint that silicon carbide has excellent strength even in high temperatures exceeding 1000° C., resistance to heat, resistance to thermal shock, resistance to abrasion, and the like. In recent years, as a metallurgical implement in the manufacture of semiconductors, it has been used as a substitute material for quartz.

As one method of producing a sintered body made of silicon carbide, there is a reaction sintering method. In the reaction sintering method, silicon carbide powder and a carbon powder or an organic substance consisting of a carbon source are dissolved in a solvent and dispersed to produce a mixed powder body in a slurry state. Then, the obtained mixed powder body is cast in a cast mold, an extrusion mold, a press mold or the like, and dried to obtain a green body. Then, the obtained green body is heated in a vacuum atmosphere or in an atmosphere of inert gas, and immersed in metallic silicon which has been melted. Then, the free carbon in the green body is made to react with the metallic silicon which is sucked into the green body, and a sintered silicon carbide is obtained.

Sintered silicon carbide obtained in accordance with such a reaction sintering method has extremely excellent strength, resistance to heat, resistance to thermal shock, and resistance to abrasion and the like. However, in recent years there has been a demand for sintered silicon carbide which has even greater high performance. Further improvements to increase density, which density greatly effects strength, resistance to heat, resistance to thermal shock, resistance to abrasion and the like, have been sought.

Increasing the density of the green body, which is an intermediate compact, is important for increasing the density of sintered silicon carbide, and attempts to achieve such are being researched and developed each day. If the density of the green body is not sufficient, not only does the density of the sintered silicon carbide to be obtained decline, but handling properties of the green body deteriorate, leading to cracks, particles and the like. Therefore, improvements have been sought after. Further, in cases where conductivity is imparted to the sintered silicon carbide (e.g., introducing a nitrogen source or the like), when the density of the green body is low, there are many instances in which the volume resistivity of the sintered silicon carbide to be obtained becomes higher, and electrical discharge machining and the like becomes difficult. Therefore, improvements have likewise been sought after.

SUMMARY OF THE INVENTION

The present invention has been created in light of the aforementioned prior art.

A first object of the present invention is to provide a silicon carbide powder which can increase the densities of a green body and a sintered silicon carbide.

A second object of the present invention is to provide a method of producing a green body having a high density and excellent handling properties, and a method of producing a sintered silicon carbide having a high density.

A means of overcoming the drawbacks described above is as follows.

A first aspect of the present invention is a silicon carbide powder formed of a silicon carbide powder (A) which has a modal diameter of 1.7 to 2.7 $\mu$m and a silicon carbide powder (B) which has a modal diameter of 10.5 to 21.5 $\mu$m, at a particulate volume ratio (the volume of silicon carbide powder (A)/the volume of silicon carbide powder (A) and the volume of silicon carbide powder (B)) of 20% to 80%.

Another aspect of the present invention is a method of producing a green body having the steps of dissolving and dispersing the aforementioned silicon carbide powder in a solvent to produce a silicon carbide mixed powder in a slurry state, and then casting into a cast mold the silicon carbide mixed powder in a slurry state and drying the silicon carbide mixed powder in a slurry state to produce a green body.

Another aspect of the present invention is a method of producing a sintered silicon carbide having a process wherein the green body obtained in accordance with the aforementioned method of producing a green body is, in one of a vacuum atmosphere and an atmosphere of inert gas, immersed in metallic silicon which has been melted, whereby the metallic silicon is made by suction to penetrate the pores in the green body and the pores in the green body are filled up.

DESCRIPTION OF THE PREFERRED EMBODIMENTS

Silicon Carbide Powder

A silicon carbide powder of the present invention is a silicon carbide powder which includes at a specific particulate volume ratio (the volume of silicon carbide powder (A)/the volume of silicon carbide powders (A) and (B)) silicon carbide powders (A) and (B) having different modal diameters. By using such a silicon carbide powder, the densities of a green body and a sintered silicon carbide can be raised.

In the silicon carbide powder of the present invention, modal diameter refers to a particle diameter most present within a particle size distribution of the powder.

An example of the silicon carbide powder of the present invention specifically includes a silicon carbide powder (AB) discussed below.

—Silicon Carbide Powder (AB)—

The silicon carbide powder (AB) is a silicon carbide powder which includes at a particulate volume ratio (the volume of silicon carbide powder (A)/the volume of silicon carbide powders (A) and (B)) of 20% to 80% a silicon carbide powder (A) whose modal diameter is 1.7 $\mu$m to 2.7 $\mu$m and a silicon carbide powder (B) whose modal diameter is 10.5 $\mu$m to 21.5 $\mu$m.

With regard to the volume of the silicon carbide powder, the weight of the silicon carbide powder is measured by a precision gravimeter, and the obtained weight is divided by a theoretical density of carbon silicon of 3.21 g/cm$^3$. The value thus calculated is adopted for the volume of the silicon carbide powder.

The silicon carbide powder (AB) includes the silicon carbide powder (A) and the silicon carbide powder (B) at a particulate volume ratio of 20% to 80%. However, the particulate volume ratio is preferably 20% to 65% and more preferably 30% to 40%. When the particulate volume ratio falls below 20% or exceeds 80%, sometimes a sufficient density for the green body and the sintered silicon carbide cannot be obtained.

In the silicon carbide powder (AB), the modal diameter of the silicon carbide powder (A) is 1.7 μm to 2.7 μm. When a silicon carbide powder (A) having a modal diameter which falls below 1.7 μm or exceeds 2.7 μm is combined with the silicon carbide powder (B), sometimes a sufficient density for the green body and the sintered silicon carbide cannot be obtained.

In the silicon carbide powder (AB), the modal diameter of the silicon carbide powder (B) is 10.5 μm to 21.5 μm. When a silicon carbide powder (B) having a modal diameter which falls below 10.5 μm or exceeds 21.5 μm is combined with the silicon carbide powder (A), sometimes a sufficient density for the green body and the sintered silicon carbide cannot be obtained.

With regard to the silicon carbide powder (A) in the silicon carbide powder (AB), the ratio ($D_{90}/D_{10}$) of a cumulative diameter that accounts for 90% of all volume of powder ($D_{90}$) to a cumulative diameter that accounts for 10% of all volume of powder ($D_{10}$) calculated according to the particle size distribution is, from the standpoint of increasing density, preferably 10 or below, more preferably 7 or below, and particularly preferably 5 or below. When this ratio exceeds 10, sometimes extremely large particles become present and impede densification.

With regard to the silicon carbide powder (B) in the silicon carbide powder (AB), the ratio ($D_{90}/D_{10}$) of a cumulative diameter that accounts for 90% of all volume of powder ($D_{90}$) to a cumulative diameter that accounts for 10% of all volume of powder ($D_{10}$) calculated according to the particle size distribution is, from the standpoint of increasing density, preferably 10 or below, more preferably 7 or below, and particularly preferably 5 or below. When this ratio exceeds 10, sometimes extremely large particles become present and impede densification.

The silicon carbide powder of the present invention may be an α-type silicon carbide powder, a β-type silicon carbide powder, an amorphous-state silicon carbide powder, or a combination of these or the like. Further, in order to obtain a green body or a sintered silicon carbide of high purity it is preferable to use a silicon carbide powder of high purity as the silicon carbide powder of the raw material.

There are no particular limitations as to the grade of the silicon carbide powder of the present invention. For example, a β-type silicon carbide powder commonly available on the market can be used.

Method of Producing a Silicon Carbide Powder

The silicon carbide powder of the present invention is preferably produced according to a production method having the following process (hereinafter referred to as the process for producing a silicon carbide powder). A silicide and an organic compound which releases carbon upon being heated are dissolved in a solvent (and depending on the need, a polymerization or cross-linking catalyst may be dissolved therein), dried, and the obtained powder is fired in a non-oxidizing atmosphere.

There are no particular limitations on the silicide (occasionally referred to hereinafter as "silicon source") as long as it is a compound which releases silicon upon being heated. A liquid silicide or a solid silicide may be used. However, from the standpoint of high purification and uniform dispersion, it is preferable that at least one type is a liquid silicide.

Suitable examples of the liquid silicide include (mono-, di-, tri-, tetra-) alkoxysilane and polymers of tetra-alkoxysilanes.

Suitable examples of the (mono-, di-, tri-, tetra-) alkoxysilane include tetra-alkoxysilanes. Suitable examples of the tetra-alkoxysilanes specifically include tetra-methoxysilane, tetra-ethoxysilane, tetra-propoxysilane, and tetra-butoxysilane. From the standpoint of handling properties, tetra-ethoxysilane is particularly preferable.

Suitable examples of the polymers of tetra-alkoxysilanes include low molecular weight polymers (oligomers) having a polymerization degree of 2 to 15 (e.g., low molecular weight polymers (oligomers) such as tetra-methoxysilane, tetra-ethoxysilane, tetra-propoxysilane, and tetra-butoxysilane) and liquid silicic acid polymers having a high polymerization degree.

Suitable examples of the solid silicide include silicon oxides. In addition to SiO, the silicon oxide in the present invention can be a silica sol (a liquid which includes colloidal ultra-fine powder, and an OH group or alkoxyl group inside), a silicon dioxide (silica gel, pulverized silica, quartz powder), or the like.

Of the aforementioned silicides, from the standpoint of homogeneity and handling properties, a low molecular weight polymer (oligomer) of tetra-ethoxysilane or a compound of a low molecular weight polymer (oligomer) of tetra-ethoxysilane and pulverized silica is preferable. Further, one type of silicide may be used singly, or two or more types of silicide may be used in combination.

The total amount of impure elements in the silicide is preferably 20 ppm or less, and more preferably 5 ppm or less. However, as long as the amount of impure elements falls within an allowable range of purification at the time of heating and sintering, the amount of impure elements is not always limited to a numerical value within the range of the aforementioned numerical value.

There are no particular limitations on the organic compound which releases carbon upon being heated (occasionally referred to as "carbon source" hereinafter). Either a liquid or a solid organic compound may be used. However, from the standpoint of high purification and uniform dispersion, it is preferable that at least one type is a liquid organic compound.

The organic compound which releases carbon upon being heated is preferably an organic compound having a high actual carbon ratio and which is crosslinked or polymerized in the presence of a catalyst and/or by being heated. Suitable examples of such an organic compound include phenol resin, furan resin, polyimide, polyurethane, a prepolymer or monomer of a resin such as polyvinyl alcohol and the like, cellulose, saccharose, pitch, and liquid organic compounds such as tar. Among these, phenol resin is preferable, and resol-type phenol resin is particularly preferable. One type of these organic compounds may be used singly, or two or more types of these organic compounds may be used in combination.

The total amount of impure elements in the organic compound which releases carbon upon being heated can be control-selected according to purpose. However, in order to obtain a silicon carbide powder of particularly high purity, it is preferable that the amount of impure elements is 5 ppm or less.

In the process for producing a silicon carbide powder, a silicon source, a carbon source, and further still a polymerization or crosslinking catalyst may, according to need, be dissolved in a solvent as described below, and a mixture of these may be hardened to produce the silicon carbide powder.

Examples of a method for hardening include a method in which crosslinking occurs due to heating, a method in which hardening occurs due to a curing catalyst, and methods which employ an electron beam or radiation.

Polymerization or crosslinking catalysts may be appropriately selected in accordance with the carbon source. However, in the case of phenol resin or furan resin, types of acid such as toluenesulfonic acid, toluencarboxylic acid, acetic acid, oxalic acid, hydochloric acid, sulfuric acid, and maleic acid, and types of amines such as hexamine are used. These mixed catalysts are dissolved or dispersed in a solvent and mixed. Examples of the solvent include lower alcohol (e.g., ethyl alcohol), ethyl ether, acetone and the like. Among these polymerization or crosslinking catalysts, toluenesulfonic acid is suitably used.

In the process for producing a silicon carbide powder, the ratio of carbon to silicon (hereinafter referred to as the C/Si ratio) is defined by elementally analyzing the carbide intermediate body which is obtained by carbonizing a mixture at a temperature of 1000° C. Stoichiometrically, when the C/Si ratio is 3.0, the free carbon in the generated silicon carbide should be 0%. Actually, however, free carbon is generated in a lower C/Si ratio due to the vaporization of SiO gas which is generated at the same time. It is important to determine the proportion in advance so that the amount of free carbon in the generated silicon carbide does not become an amount which is unsuitable for the purpose of producing a sintered body. Ordinarily, in firing at a temperature of 1600° C. or higher in the area of 1 atm, when the C/Si ratio becomes 2.0 to 2.5, the free carbon can be restrained and this range can be suitably used. When the C/Si ratio is 2.5 or higher, the free carbon increases markedly. However, since the free carbon also has an effect of inhibiting particle growth, the C/Si ratio may be appropriately selected in accordance with an aim to form particles.

However, since the C/Si ratio for obtaining a pure silicon carbide will vary when firing at a low atmospheric pressure or a high atmospheric pressure, this case is not always limited to the range of the aforementioned C/Si ratio.

In the process for producing a silicon carbide powder, it is preferable that the firing is effected by dissolving the silicon source and the carbon source in the solvent, and heating the dried powder at a temperature of 1350° C. to 2000° C. in a non-oxidizing atmosphere of argon or the like to generate the silicon carbide. The firing temperature and firing time can be appropriately selected in accordance with qualities such as desired particle size and the like. However, firing at a temperature of 1600° C. to 1900° C. is particularly preferable for a more efficient formation.

In the process for producing a silicon carbide powder, the powder which has been obtained by dissolving the silicon source and the carbon source in a solvent and drying the mixture may be heat-carbonized prior to firing in order to eliminate volatile gas and water content and to improve handling properties. The heat-carbonization is preferably effected by heating the powder for 30 minutes to 120 minutes at a temperature of 800° C. 1000° C. in a non-oxidizing atmosphere of nitrogen, argon or the like.

In the process for producing a silicon carbide powder, a heating treatment may be administered for 5 minutes to 20 minutes at a temperature of 2000° C. to 2100° C. in order to obtain a silicon carbide powder having an even higher purity. Impurities can thereby be removed with this heating treatment.

In the process for producing a silicon carbide powder, agitated mixing can be carried out according to well-known agitated mixing means such as a mixer, a planet bowl mill or the like. The agitated mixing is preferably conducted from 10 hours to 30 hours and more preferably from 16 hours to 24 hours.

In the process for producing a silicon carbide powder, when a silicon carbide powder having a particularly high purity is desired, the method for producing a raw material powder disclosed in the method of producing a single crystal of Japanese Patent Application Laid-Open (JP-A) No. 9-48605, which was previously filed by the applicant of the present application, can be used. In this method of producing a silicon carbide powder having a high purity, one type or more selected from tetra-alkoxysilanes and polymers of tetra-alkoxysilanes is used as a silicon source, and an organic compound of a high purity which generates carbon upon being heated is used as a carbon source. The silicon source and the carbon source are homogeneously mixed and the obtained mixture is heat-fired in a non-oxidizing atmosphere to obtain a silicon carbide powder. This is the step of forming a silicon carbide powder. The obtained silicon carbide powder is stored at a temperature of 1700° C. or higher to less than 2000° C. While the obtained silicon carbide powder is being stored at the aforementioned temperature, a treatment of heating at a temperature of 2000° C. to 2100° C. for 5 minutes to 20 minutes is conducted at least once. This is the step of post-treatment. By conducting these two steps, a silicon carbide powder is obtained in which the amount of respective impure elements is 0.5 ppm or less.

As explained above, since the size of the obtained silicon carbide powder is not uniform, the obtained silicon carbide powder is treated by powderization and classification to conform to the previously mentioned modal diameter and, depending on the necessity, to the cumulative diameter ratio ($D_{90}/D_{10}$). By mixing the silicon carbide powder which has two types of modal diameters and, depending on the necessity, the cumulative diameter ratio ($D_{90}/D_{10}$) which have thus been treated, the silicon carbide powder of the present invention can be obtained.

Method of Producing a Green Body

The method of producing a green body of the present invention has a step in which a silicon carbide powder is dissolved in a solvent and dispersed to produce a silicon carbide mixed powder in a slurry state (occasionally referred to hereinafter as a "step in which a silicon carbide mixed powder in a slurry state is produced from a silicon carbide powder"), and a step in which the silicon carbide mixed powder in a slurry state is poured into a mold and dried to produce a green body (occasionally referred to hereinafter as a "step in which a green body is produced from a silicon carbide mixed powder in a slurry state"). By using the silicon carbide powder of the present invention, a green body having high densification and excellent handling properties can be obtained.

—Step in Which a Silicon Carbide Mixed Powder in a Slurry State is Produced From a Silicon Carbide Powder—

In the step in which a silicon carbide mixed powder in a slurry state is produced from a silicon carbide powder, the silicon carbide powder of the present invention (occasionally referred to hereinafter simply as "silicon carbide powder") is dissolved in a solvent and dispersed to produce a silicon carbide mixed powder in a slurry state. Pores in the green body can be uniformly dispersed by thorough agitated mixing at the time that the silicon carbide powder is dissolved in the solvent and dispersed.

In the step in which a silicon carbide mixed powder in a slurry state is produced from a silicon carbide powder, the silicon carbide powder is dissolved in the solvent and dispersed to produce a silicon carbide mixed powder in a slurry state. Water may be used as the solvent. However, when a phenol resin is used as an organic compound which generates carbon upon being heated, lower alcohol types such as ethyl alcohol and the like, ethyl ether, and acetone and the like are preferable as the solvent. Further, it is preferable that an organic substance serving as the carbon source, a carbon powder, and a solvent which each have a low amount of impurities are used.

In the step in which a silicon carbide mixed powder in a slurry state is produced from a silicon carbide powder, an organic binder may also be added. Examples of the organic binder include a deflocculant, a powder adhesive and the like. When giving conductivity, from the perspective of raising effect, a nitrogen compound is preferable as the deflocculant. For example, ammonia, polyacrylic acid ammonium salt and the like may be suitably used. As the powder adhesive, a polyvinyl alcohol, a urethane resin (e.g., water-soluble polyurethane) and the like may be suitably used. Further, a defoaming agent may also be added. Examples of the defoaming agent include a silicon defoaming agent and the like.

In the step in which a silicon carbide mixed powder in a slurry state is produced from a silicon carbide powder, agitated mixing can be conducted according to a well-known agitated mixing means such as a mixer, a planet bowl mill and the like. The agitated mixing is preferably conducted for 10 hours to 30 hours, and more preferably 16 hours to 24 hours.

—Step in Which a Green Body is Produced From a Silicon Carbide Mixed Powder in a Slurry State—

In the step in which a green body is produced from a silicon carbide mixed powder in a slurry state, it is preferable that a green body having prescribed dimensions is produced by casting the silicon carbide mixed powder in a slurry state in a plaster or resin cast, leaving it, removing it from the cast, and then heat-drying at a temperature of 50° C. to 60° C. or naturally drying to remove the solvent. Further, depending on the necessity, firing may also be conducted within a temperature range of about 1200° C. to about 2400° C. in order to remove trace quantities of water content, deflocculent, binder and the like from the obtained green body, or in order to amply promote contact among particles of the silicon carbide powder in the green body to obtain contact strength (the green body obtained in accordance with this firing may be referred to as a "calcinated green body" on occasion).

Method of Producing a Sintered Silicon Carbide

The method of producing a sintered silicon carbide of the present invention consists of a process in which the green body obtained by the method of producing a green body of the present invention is immersed in molten metallic silicon in a vacuum atmosphere or in an atmosphere of inert gas such that the metallic silicon is made by suction to penetrate the pores in the green body and thereby fill up the pores in the green body (this process is occasionally referred to hereinafter as the "process in which a sintered silicon carbide is produced from a green body").

In the process in which a sintered silicon carbide is produced from a green body, the green body obtained by the method of producing a green body of the present invention (occasionally referred to hereinafter simply as "green body") is immersed in molten metallic silicon which has been heated to the melting point or higher of metallic silicon, preferably 1450° C. to 1700° C., in a vacuum atmosphere or in an atmosphere of inert gas. By immersing the green body in molten metallic silicon in this way, the liquefied metallic silicon penetrates the pores in the green body by suction (e.g., by a capillary phenomenon) such that the pores in the green body are filled in by the metallic silicon. Because the green body obtained by the method of producing a green body of the present invention has a high density, it is possible to obtain a sintered silicon carbide having a high density.

In the process in which a sintered silicon carbide is produced from a green body, there are no particular limitations on the time in which the green body is immersed in the molten metallic silicon. The time is appropriately determined on the basis of size and the like.

The metallic silicon is heated to a temperature between 1450° C. and 1700° C., preferably to a temperature between 1550° C. and 1650° C., and melted. When the melting temperature is less than 1450° C., the metallic silicon becomes unable to penetrate the green body by suction since the adhesiveness of the metallic silicon rises. When the melting temperature exceeds 1700° C., vaporization becomes marked and damage is inflicted on the furnace casing.

Examples of the metallic silicon include powder, granule or massive metallic silicon, and 2 mm to 5 mm massive metallic silicon can be suitably used. The metallic silicon is preferably a metallic silicon of a high purity in which the total amount of impurities is less than 1 ppm.

In the process in which a sintered silicon carbide is produced from a green body, a sintered silicon carbide is obtained by the pores of the green body being filled with the metallic silicon.

In the process in which a sintered silicon carbide is produced from a green body, there are no particular limitations on the production devices and the like as long as they are able to satisfy the aforementioned heating conditions. Well-known heating furnaces and reactors can be used.

Other

The sintered silicon carbide obtained in accordance with the method of producing a sintered silicon carbide of the present invention may also include nitrogen for the purpose of imparting conductivity. The nitrogen can be introduced by adding at least one or more types of compounds which include nitrogen (occasionally referred to hereinafter as a "nitrogen source") during the process in which the silicon carbide powder is produced or during the process in which the silicon carbide mixed powder in a slurry state is produced from the silicon carbide powder.

The nitrogen source is preferably a substance which releases nitrogen upon being heated. Examples include polymer compounds (specifically, polyimide resins, nylon resins and the like) and various types of organic amines (specifically, hexamethylenetetramine, ammonia, triethylamine and the like or compounds of these, and salts of these). Among these, hexamethylenetetramine is preferable. A phenol resin containing nitrogen originating from a synthesizing process, during which process the phenol resin was synthesized using hexamine as a catalyst, at 2.0 mmol or more with respect to 1 g of resin may also be suitably used as the nitrogen source. These nitrogen sources may be used singly or in combinations of two or more.

When introducing the nitrogen source during the process in which a silicon carbide powder is produced, it is preferable to add the nitrogen source at the same time as the silicon source and the carbon source.

Since it is preferable that the nitrogen is included at 1 mmol or more in the area of 1 g of the silicon source, the amount of additive of the nitrogen source in this case is preferably 80 μg to 1000 μg with respect to 1 g of the silicon source.

In the step in which the silicon carbide mixed powder in a slurry state is produced from the silicon carbide powder, when introducing the nitrogen source, a method in which the nitrogen source is added to the solvent and dissolved and dispersed at the same time that the silicon carbide powder is dissolved and dispersed in the solvent is preferable.

Since it is preferable that the nitrogen is included at 0.7 mmol or more in the area of 1 g of the silicon carbide powder, the amount of additive of the nitrogen source in this case is preferably 200 μg to 2000 μg, and more preferably 1500 μg to 2000 μg, with respect to 1 g of the silicon carbide powder.

The sintered silicon carbide obtained by the above method of production may be subjected to treatments such as processing, polishing, cleansing and the like in accordance with the purpose for use.

EXAMPLES

The present invention will hereinafter be concretely explained with reference to Examples. However, the present invention is not limited in any way to these Examples as long as the effects of the present invention are not hampered.

Example 1

Preparation of Silicon Carbide Powder
(Silicon Carbide Powder α)

A silicon carbide powder (including silica at 1.5% by weight) having a high purity, containing 5 ppm or less of impurities, and produced in accordance with the production method disclosed in Japanese Patent Application Laid Open (JP-A) No. 9-48605 was powderized by a counter jet mill and classified by a classifier to produce a silicon carbide powder a having a modal diameter of 2.3 μm, an average particle diameter ($D_{50}$) of 2.195 μm, and a cumulative diameter ratio ($D_{90}/D_{10}$) of 8.69.
(Silicon Carbide Powder β)

A silicon carbide powder β, having a modal diameter of 16.4 μm, an average particle diameter ($D_{50}$) of 14.81 μm, and a cumulative particle diameter ratio ($D_{90}/D_{10}$) of 2.9, was produced in the same manner as the silicon carbide powder a.
(Silicon Carbide Powder of the Present Invention)

90 g of the silicon carbide powder α and 210 g of the silicon carbide powder β were mixed (particulate volume ratio (the volume of silicon carbide powder α/the volume of silicon carbide powder α and the volume of silicon carbide powder β) 30%), and 300 g of the silicon carbide powder of the present invention was prepared.

Production of a Green Body and a Calcinated Green Body

Together with a 150 g ball (nylon resin-made, ø10 mm), the aforementioned silicon carbide powder was placed into 142 g of water in which 3 g of polyacrylic acid ammonium as a deflocculant had been dissolved, and dispersed and mixed for 16 hours by a ball mill. Then, 12 g of a water-soluble polyurethane (manufactured by Chukyo Yushi, "SERUNA WE 515") as a power adhesive (a binder) and 1 g of a silicone defoaming agent (manufactured by Shinetsu Kagaku, Ltd., "KM72A") were added, and further dispersed and mixed for 10 minutes by a ball mill. A silicon carbide mixed powder in a slurry state having a viscosity of 0.9 poise was thereby produced.

The silicon carbide mixed powder in a slurry state was cast in a resin mold (a disc mold having a diameter of ø120 mm and a thickness of 20 mm), removed therefrom, and dried for 24 hours (at 40° C.) to produce a green body.

The green body was then fired at 1800° C. to produce a calcinated green body.

Production of a Sintered Silicon Carbide

Next, the calcinated green body was immersed in a 2 mm to 5 mm mass of highly pure metallic silicon (manufactured by Kojundo Chemical Laboratory Co., Ltd.) which has been melted in an argon atmosphere at a temperature raised to 1550° C. in a carbon crucible having an internal diameter of 60 mm and a height of 80 mm. Then the calcinated green body was retained for 30 minutes. As a result, the molten metallic silicon which had penetrated the green body by a capillary phenomenon filled in the pores of the green body to produce the sintered silicon carbide of Example 1.

Example 2

150 g of the silicon carbide powder α and 150 g of the silicon carbide powder β were mixed (particulate volume ratio (the volume of silicon carbide powder α/the volume of silicon carbide powder α and the volume of silicon carbide powder β) 50%) to produce the silicon carbide powder.

With the exception that this silicon carbide powder was used, the green body, the calcinated green body, and the sintered silicon carbide were produced in the same manner as that of Example 1.

Example 3

210 g of the silicon carbide powder a and 90 g of the silicon carbide powder β were mixed (particulate volume ratio (the volume of silicon carbide powder α/the volume of silicon carbide powder α and the volume of silicon carbide powder β) 70%) to produce the silicon carbide powder.

With the exception that this silicon carbide powder was used, the green body, the calcinated green body, and the sintered silicon carbide were produced in the same manner as that of Example 1.

Comparative Example 1

With the exception that 300 g of the silicon carbide powder a was used, the green body, the calcinated green body, and the sintered silicon carbide of Comparative Example 1 were produced in the same manner as that of Example 1.

Comparative Example 2

With the exception that 300 g of the silicon carbide powder β was used, the green body, the calcinated green body, and the sintered silicon carbide of Comparative Example 2 were produced in the same manner as that of Example 2.

Evaluation

An evaluation of the sintered silicon carbides of Examples 1–3 and Comparative Examples 1–2 was conducted based on measurements of the density of the green bodies obtained by each respective production process and measurements of the density of the sintered silicon carbides obtained by each respective production process. The results are shown in Table 1.

Measurement of Densities

The densities of the green bodies and the sintered silicon carbides were measured in accordance with Archimedes' principle.

TABLE 1

| | | Comp. Ex. 1 | Comp. Ex. 2 | Ex. 1 | Ex. 2 | Ex. 3 |
|---|---|---|---|---|---|---|
| Silicon carbide mixed powder in a slurry state | Content weight (g) of silicon carbide powder α (2.3 μm) | 300 | — | 90 | 150 | 210 |
| | Content weight (g) of silicon carbide powder β (16.4 μm) | — | 300 | 210 | 150 | 90 |
| | Volumetric ratio (%) | 100 | 0 | 30 | 50 | 70 |
| Green body | Density (g/cm$^3$) | 1.98 | 1.87 | 2.38 | 2.37 | 2.26 |
| Calcinated green body | Density (g/cm$^3$) | 1.93 | 1.85 | 2.35 | 2.33 | 2.23 |
| Sintered silicon carbide | Density (g/cm$^3$) | 2.84 | 2.82 | 2.96 | 2.94 | 2.92 |

As Table 1 illustrates, when the silicon carbide powder of the present invention is used, the densities of a green body and a sintered silicon carbide are improved.

According to the present invention, a silicon carbide powder which can increase the densities of a green body and a sintered silicon carbide, a method of producing a green body having a high density and excellent handling properties, and a method of producing a sintered silicon carbide having a high density, in which methods the silicon carbide powder is used, can be provided.

What is claimed is:

1. A silicon carbide powder comprising a silicon carbide powder (A) which has a modal diameter of 1.7 to 2.7 μm and a silicon carbide powder (B) which has a modal diameter of 10.5 to 21.5 μm, at a particulate volume ratio (the volume of silicon carbide powder (A)/the volume of silicon carbide powder (A) and the volume of silicon carbide powder (B)) of 20% to 80%, wherein
    a ratio ($D_{90}/D_{10}$) of a cumulative diameter that accounts for 90% of all volume of powder ($D_{90}$) to a cumulative diameter that accounts for 10% of all volume of powder ($D_{10}$) calculated according to particle size distribution in the silicon carbide powder (A) is 10 or less, and
    a ratio ($D_{90}/D_{10}$) of a cumulative diameter that accounts for 90% of all volume of powder ($D_{90}$) to a cumulative diameter that accounts for 10% of all volume of powder ($D_{10}$) calculated according to particle size distribution in the silicon carbide powder (B) is 10 or less.

2. The silicon carbide powder according to claim 1, wherein a ratio ($D_{90}/D_{10}$) of a cumulative diameter that accounts for 90% of all volume of powder ($D_{90}$) to a cumulative diameter that accounts for 10% of all volume of powder ($D_{10}$) calculated according to a particle size distribution in the silicon carbide powder (A) is 7 or less.

3. The silicon carbide powder according to claim 1, wherein a ratio ($D_{90}/D_{10}$) of a cumulative diameter that accounts for 90% of all volume of powder ($D_{90}$) to a cumulative diameter that accounts for 10% of all volume of powder ($D_{10}$) calculated according to a particle size distribution in the silicon carbide powder (A) is 5 or less.

4. The silicon carbide powder according to claim 1, wherein a ratio ($D_{90}/D_{10}$) of a cumulative diameter that accounts for 90% of all volume of powder ($D_{90}$) to a cumulative diameter that accounts for 10% of all volume of powder ($D_{10}$) calculated according to a particle size distribution in the silicon carbide powder (B) is 7 or less.

5. The silicon carbide powder according to claim 1, wherein a ratio $D_{90}/D_{10}$ of a cumulative diameter that accounts for 90% of all volume of powder ($D_{90}$) to a cumulative diameter that accounts for 10% of all volume of powder ($D_{10}$) calculated according to a particle size distribution in the silicon carbide powder (B) is 5 or less.

6. The silicon carbide powder according to claim 1, wherein the particulate volume ratio is 20% to 65%.

7. The silicon carbide powder according to claim 1, wherein the particulate volume ratio is 30% to 40%.

8. The silicon carbide powder according to claim 1, wherein at least one of the silicon carbide powder (A) and the silicon carbide powder (B) contains nitrogen.

9. A sintered silicon carbide comprising a silicon carbide powder (A) which has a modal diameter of 1.7 to 2.7 μm and a silicon carbide powder (B) which has a modal diameter of 10.5 to 21.5 μm, at a particulate volume ratio (the volume of silicon carbide powder (A)/the volume of silicon carbide powder (A) and the volume of silicon carbide powder (B)) of 20% to 80%, wherein
    a ratio ($D_{90}/D_{10}$) of a cumulative diameter that accounts for 90% of all volume of powder ($D_{90}$) to a cumulative diameter that accounts for 10% of all volume of powder ($D_{10}$) calculated according to particle size distribution in the silicon carbide powder (A) is 10 or less, and
    a ratio ($D_{90}/D_{10}$) of a cumulative diameter that accounts for 90% of all volume of powder ($D_{90}$) to a cumulative diameter that accounts for 10% of all volume of powder ($D_{10}$) calculated according to particle size distribution in the silicon carbide powder (B) is 10 or less.

10. A method of producing a green body comprising the steps of:
    dispersing the silicon carbide powder according to claim 1 in a solvent to produce a silicon carbide mixed powder in a slurry state; and
    casting into a cast mold the silicon carbide mixed powder in a slurry state and drying the silicon carbide mixed powder in a slurry state to produce a green body.

11. The method of producing a green body according to claim 10, wherein an organic binder is added in the step of producing a silicon carbide mixed powder in a slurry state.

12. The method of producing a green body according to claim 10, wherein a compound which contains nitrogen is added in the step of producing a silicon carbide mixed powder in a slurry state.

13. A method of producing a sintered silicon carbide comprising a process wherein the green body obtained in accordance with the method of producing a green body according to claim 10 is, in one of a vacuum atmosphere and an atmosphere of inert gas, immersed in metallic silicon which has been melted, whereby the metallic silicon is made by suction to penetrate the pores in the green body and the pores in the green body are filled up.

14. The method of producing a sintered silicon carbide according to claim 13, wherein the metallic silicon is heated to a temperature between 1450° C. and 1700° C. and melted.

15. The method of producing a sintered silicon carbide according to claim 13, wherein the metallic silicon is heated to a temperature between 1550° C. and 1650° C. and melted.

* * * * *